Patented Feb. 1, 1927.

1,616,202

UNITED STATES PATENT OFFICE.

ALEXANDER M. SHOOK, OF TORONTO, ONTARIO, CANADA, ASSIGNOR TO AQUAZONE CORPORATION, OF NEW YORK, N. Y., A CORPORATION OF DELAWARE.

PROCESS OF MAKING AQUEOUS SOLUTIONS AND THE PRODUCT.

No Drawing. Application filed October 16, 1923, Serial No. 668,848, and in Canada June 9, 1923.

This invention relates to the process of making aqueous solutions of solutes in a plurality of phases, particularly where one of the solutes is in a gaseous phase, and to the product thereof.

An object of this invention is to provide an improved process of getting a plurality of phases into solution, particularly where one of the phases may have a deleterious action upon another.

Another object of this invention is to provide an improved solution which is stable, palatable and adapted to applications in the arts.

Another object is to provide a solution which is adapted to hold relatively large quantities of mineral and gaseous solutes without flocculation, sedimentation or transit ebullition of gas.

Still another object is to provide an improved process of adapting aqueous solutions to take up and hold in solution mineral solutes of difficult solubility.

Other objects of the invention will in part be obvious and will in part appear hereinafter.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

In the practice of this invention an aqueous body is made to take up and hold in solution large quantities of the gaseous solute in addition to another body, particularly solid solute which may be somewhat difficultly soluble in water. It is contemplated however, that the other body in solution may be or includes a liquid phase.

The producing solutions of gases in liquids requires considerable care, if the amount of gas to be absorbed approaches or exceeds the point of saturation. By the process disclosed in United States Letters Patent No. 1,469,581, granted October 2, 1923, highly supersaturated solutions of gas may be produced which hold the gas retentively for a relatively long period of time. Transient ebullition of the gases is avoided by having the gas in a substantially adsorbed condition in the solvent body.

It is known that undue agitation of the solvent prevents the intimate molecular dispersion which enables the solvent to adsorb the gaseous solute when producing supersaturated solutions of this character. Also it is known that supersaturation must be initially effected under a relatively high pressure of several atmospheres and that there is an optimum temperature and pressure at which to produce a desired degree of supersaturation.

Another factor which is known to produce transient ebullition of gas from solutions of gaseous solutes is the occurrence in the solution of fine particles which form nucleæ about which gas bubbles may form and subsequently ebulliate away.

Where it is desired to have the solution hold in addition to the gaseous solute, another body which may be introduced in either a liquid or solid phase the conditions conductive to a supersaturated condition of the gas must be met. If the solid or liquid phases are added to the saturated solution an ebullition of the gas may be produced either on account of the agitation or on account of the nucleæ produced in the body of the aqueous solvent so that production of the desired supersaturated solution is thereby prevented. To add initially the additional solute in the liquid or solid phase is also not free of difficulties because the body of the solvent may contain or produce particles which become nucleæ for the subsequent ebullition of the gas which is intended to be absorbed. This difficulty is enhanced particularly where the additional solute is in the solid phase and comprises bodies such as mineral solids of relatively difficult solubility in water. In such instances there is a tendency for flocculation and sedimentation, the floating particles of which readily serve as nucleæ for gas bubbles and produce transient ebullition of gas.

By the procedure of this invention these difficulties are avoided since the body of the solvent is initially treated to remove all suspended particles which might serve to form nucleæ for gas bubbles. The additional solute is preferably added in the liquid phase and is so treated as to insure a high degree of solubility when added to the body of the solution which may then be subject to the passage of streams of gas to effect the desired solution.

Where the gas or a portion of the gas to be dissolved will affect the co-efficient of the solubility of the main solvent for the solid or liquid phases added, it may be desirable to treat the body of the main solvent with such gas or a portion thereof sufficiently to effect such change. Consequently, when the additional solute is added in the liquid phase, care having been taken to remove initially all suspended particles from the added liquid subsequent flocculation, or sediment does not result.

This procedure is particularly adapted to the production of aqueous solutions of oxygen or solutions of a mixture of oxygen and carbon dioxide where a mineral solute is added for therapeutic or beverage purposes. For therapeutic purposes it is frequently desirable to provide an oxygenated mineral water which shall contain in solution the mineral salts normally found in certain springs known to have therapeutic value, such salts may be, for example: phosphates of lithium, sodium or potassium; carbonate of lithium, sodium or potassium; chlorides and sulphates of lithium, sodium and potassium. Calcium salts may also be added, such as calcium sulphate and calcium carbonate.

The following is given as an example of an oxygenated mineral water produced in accordance with this invention, which also contains carbon dioxide gas in solution.

Step one, a body of water at a temperature not in excess of 60° F. is run into a closed treating chamber until 90% of its cubicle capacity is filled, this body of water is initially conditioned so as to remove gas forming nucleæ, as for example by careful filtering.

Step two, the solute other than the gas is now prepared in a liquid form, to be added to the contents of the treating chamber. This is effected by dissolving the mineral salts in a body of water not greater than 5% of the cubicle contents of the treating chamber. The solids to be dissolved may be for example: disodium hydrogen phosphate .07 parts by weight of the solvent, potassium bicarbonate .07 parts, sodium bicarbonate .07 parts, sodium chloride .0015 parts and sodium sulphate .02 parts. Calcium and magnesium salts are frequently found in such solutions to a sufficient degree in the water so that there is little reason for adding these to tap water coming from wells or the like. It is found in effecting these solutions that heating the water nearly to boiling and dividing it into fractions, to which portions the salts are added and then mixed together and filtered, yields a solute which can be added gently or with slight agitation to the aqueous body of liquid in the treating chamber without liability of sedimentation or flocculation.

Step three, the gaseous solute is now passed into the solution. This may be effected by pumping against a head of pressure a continuous stream of an oxygen bearing body of gas, the desired quantity of oxygen being passed into solution when maintaining the desired head of pressure in the treating chamber. The head of pressure which is found suitable is substantially 140 pounds, the treating period being approximately one-half hour, the temperature not being permitted to exceed 60° F. The carbon dioxide gas may be passed into the body simultaneously with the oxygen gas, or for a period prior thereto, or just subsequent thereto. A prior treatment with carbon dioxide gas is particularly desirable where calcium salts are to be held in solution as the aqueous body can be made initially very slightly acid by such initial treatment with carbon dioxide gas, and is thus adapted to take up and hold in solution a calcium salt which is otherwise difficultly soluble.

Step four, the solution is now stabilized and bottled. This is effected by permitting the solution thus treated in the container to stand for a brief period and then to have its pressure reduced to that of the bottling pressure, the head of pressure being maintained all during the bottling period in order to avoid unstabilizing conditions.

Solutions of this character will contain from 20 to 35 cubic centimeters of oxygen per litre of water. The gaseous solute will be retained retentively for relatively a long period of time. Noticeable quantities of gas may be seen to ebulliate away on agitation when the solution has been standing uncovered for a period of hours.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent, is:

1. The process of producing solutions containing solutes introduced in a plurality of phases, one being a gaseous phase, which comprises conditioning the body of the solvent in a manner to free it of gas forming nucleæ, introducing the solute not in a gaseous phase under conditions preventing the formation of gas forming nucleæ, and introducing the gaseous solute under conditions of temperature and pressure favorable to adsorption and in amounts adapted to produce supersaturated solutions.

2. The process of producing solutions containing solutes introduced in a plurality of phases, one being a gaseous phase, which comprises conditioning the body of the solvent in a manner to free it of gas forming nucleæ, introducing the solute not in a gaseous phase under conditions preventing the formation of gas forming nucleæ, introducing the gaseous solute under conditions of temperature and pressure favorable to adsorption, and subsequently reducing the treating pressure and bottling the solution.

3. The process of producing solutions containing solutes introduced in a plurality of phases, one being a gaseous phase, which comprises conditioning the body of the solvent in a manner to free it of gas forming nucleæ, introducing the solute not in a gaseous phase under conditions preventing the formation of gas forming nucleæ, introducing the gaseous solute under conditions of temperature and pressure favorable to adsorption and in amounts adapted to produce supersaturated solutions, and subsequently reducing the treating pressure and bottling the solution.

4. The process of producing solutions containing solutes introduced in a plurality of phases, one being a gaseous phase, which comprises conditioning the body of the solvent in a manner to free it of gas forming nucleæ, introducing a mineral solute in a liquid phase under conditions avoiding the formation of gas forming nucleæ, introducing the gaseous solute under conditions of temperature and pressure favorable to adsorption, and subsequently reducing the treating pressure and bottling the solution.

5. The process of producing solutions containing solutes introduced in a plurality of phases, one being a gaseous phase, which comprises conditioning the body of the solvent in a manner to free it of gas forming nucleæ, introducing a mineral solute in a liquid phase under conditions avoiding the formation of gas forming nucleæ, introducing a plurality of gaseous solutes into the solvent under conditions of temperature and pressure favorable to adsorption, and subsequently reducing the treating pressure and bottling the solution.

6. The process of producing solutions containing solutes introduced in a plurality of phases, one being a gaseous phase, which comprises conditioning the body of the solvent in a manner to free it of gas forming nucleæ, introducing a solution of mineral solutes containing compounds of the alkali earths and metals under conditions avoiding the formation of gas forming nucleæ, introducing into the solvent a plurality of gaseous solutes under conditions of temperature and pressure favorable to adsorption, and subsequently reducing the treating pressure and bottling the solution.

7. The process of producing solutions containing solutes introduced in a plurality of phases, one being a gaseous phase, which comprises conditioning the body of the solvent in a manner to free it of gas forming nucleæ, introducing a solution comprising essentially disodium hydrogen phosphate, sodium bicarbonate, potassium bicarbonate, and sodium sulphate, under conditions avoiding the formation of gas forming nucleæ, and introducing as the gaseous solute, both oxygen and carbon dioxide under conditions and pressure favorable to adsorption.

8. The process of producing solutions containing solutes introduced in a plurality of phases, one being a gaseous phase, which comprises conditioning the body of the solvent in a manner to free it of gas forming nucleæ, introducing a solution comprising essentially disodium hydrogen phosphate, sodium bicarbonate, sodium sulphate, sodium chloride and potassium bicarbonate under conditions avoiding the formation of gas forming nucleæ, introducing as the gaseous solute both oxygen and carbon dioxide under conditions of temperature and pressure favorable to adsorption and in amounts adapted to produce supersaturation, and subsequently reducing the treating pressure and bottling the solution.

9. As an article of manufacture, a solution containing as solutes, mineral salts and oxygen, the latter being retentively held in adsorbed condition; the mineral salts comprising essentially disodium hydrogen phosphate, sodium bicarbonate, sodium sulphate, sodium chloride and potassium bicarbonate, the same being held in a solution in a manner avoiding the production of gas forming nucleæ.

10. As an article of manufacture, a solution containing as solutes, mineral salts, oxygen and carbon dioxide, the two latter being retentively held in adsorbed condition; the mineral salts comprising essentially disodium hydrogen phosphate, sodium bicarbonate, sodium sulphate, sodium chloride and potassium bicarbonate, the same being held in a solution in a manner avoiding the production of gas forming nucleæ.

In testimony whereof I affix my signature.

ALEXANDER M. SHOOK.